United States Patent
Penzotti

[11] Patent Number: 6,149,142
[45] Date of Patent: Nov. 21, 2000

[54] PNEUMATIC VEHICLE SUSPENSION SYSTEM WITH VARIABLE SPRING STIFFNESS

[75] Inventor: Roger P. Penzotti, Mount Vernon, Wash.

[73] Assignee: Paccar, Inc., Bellevue, Wash.

[21] Appl. No.: 09/233,403

[22] Filed: Jan. 19, 1999

[51] Int. Cl.[7] .................................................. F16F 9/04
[52] U.S. Cl. ................... 267/64.19; 280/124.157
[58] Field of Search .............................. 267/64.19, 64.23, 267/64.25, 64.27, 64.28, 122, 123, 126, 127; 280/124.157, 124.16, 124.161, 678, 683

[56] References Cited

U.S. PATENT DOCUMENTS

| | | | |
|---|---|---|---|
| 5,374,077 | 12/1994 | Penzotti et al. | 280/711 |
| 5,701,969 | 12/1997 | Stephens | 180/300 |

*Primary Examiner*—Michael Mar
*Assistant Examiner*—Xuan Lan Nguyen
*Attorney, Agent, or Firm*—Seed IP Law Group PLLC

[57] ABSTRACT

A pneumatic suspension system for a vehicle providing minimum pneumatic spring stiffness to minimize frame beaming in the vehicle frame. In one embodiment of the invention, the pneumatic suspension system has a first pneumatic spring connected to a first axle and to the frame. A second pneumatic spring is connected to the second axle and to the frame. The first and second pneumatic springs contain pneumatic fluid. A conduit containing pneumatic fluid is in fluid communication with the first and second pneumatic springs. The conduit allows the fluid to move between the first and second pneumatic springs. The pneumatic fluid in the conduit has a fluid resonant frequency. The first and second pneumatic springs and the conduit define a system having a variable stiffness dependent upon an input vibration frequency. The input vibration frequency is a predetermined fraction of the fluid resonant frequency. The pneumatic conduit is sized so the predetermined fraction of the fluid resonant frequency corresponds to the frame beaming frequency, thereby providing minimum stiffness of the system at the frame beaming frequency.

21 Claims, 7 Drawing Sheets

PNEUMATIC VEHICLE SUSPENSION SYSTEM WITH VARIABLE SPRING STIFFNESS

TECHNICAL FIELD

The present invention is directed to the field of suspension systems, and more particularly, to pneumatic suspension systems for tandem axle vehicles.

BACKGROUND OF THE INVENTION

The most common configuration for large trucks to transport goods on interstate highways is the tractor-semitrailer combination. The tractor is a power unit having a single steer axle at the front and tandem driving axles at the rear. The semitrailer is coupled to the tractor by a fifth wheel assembly attached to the tractor's frame. Operating conditions, such as the loads on the tractors, can vary greatly depending upon whether a semitrailer is fully loaded, lightly loaded, or even attached to the tractor at all. The tractors typically have suspension systems designed to provide desired ride and handling characteristics for different operating conditions.

The vast majority of modern highway tractors have pneumatic suspension systems that include air springs. The air springs are relatively light compared to other types of springs, and the stiffness of the air springs varies nearly in proportion to the load being carried. In addition, the natural frequency of a conventional air suspension varies little with changes in load, thereby allowing the suspension system to provide a soft ride under a wide range of loads. Air springs also permit the static height of the suspension to be maintained, independent of the load, through the use of a height control valve. The height control valve senses the position of the suspension and supplies or exhausts air from the air spring as required to maintain a constant ride height. These are particularly desirable features for large trucks since the load supported by the suspension system can change significantly between a fully loaded condition and a lightly loaded condition.

Figure 1:
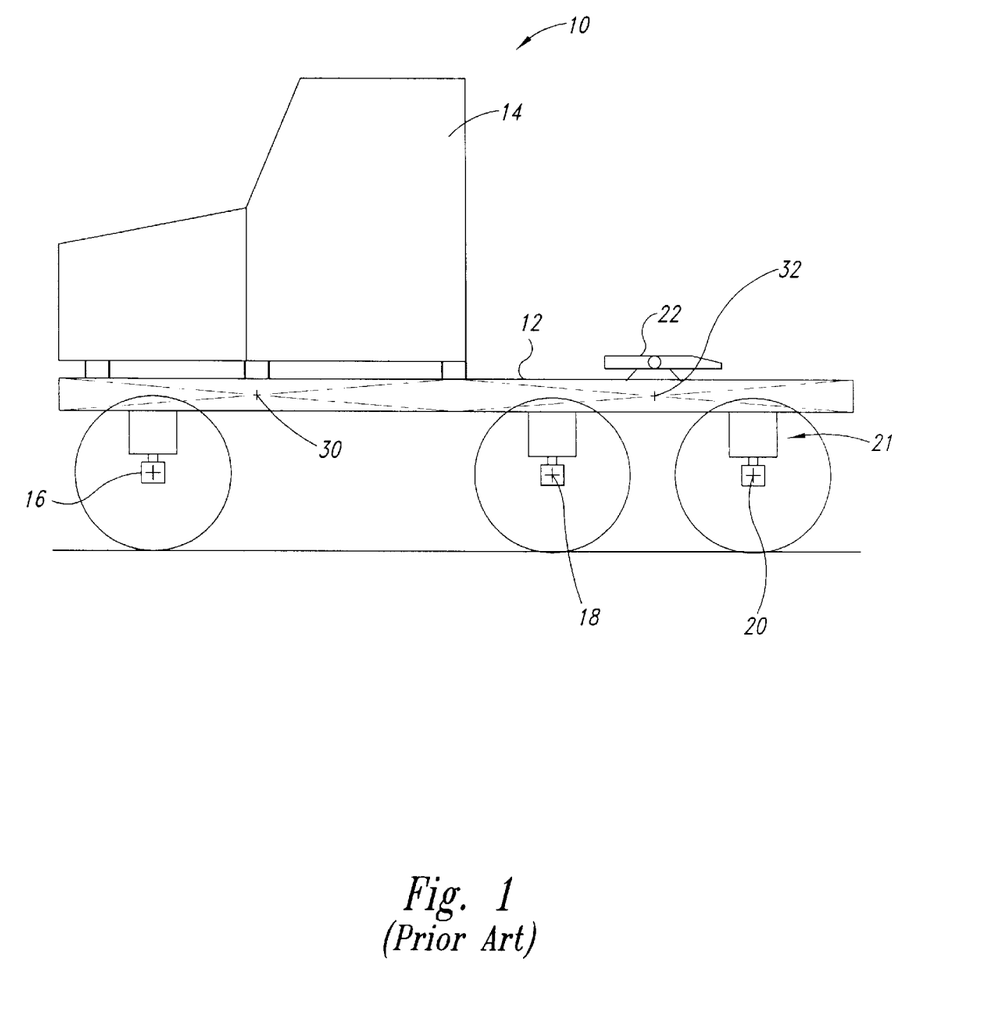
FIG. 1 is a schematic side elevation view of a truck of the type having a prior art pneumatic suspension system.

FIG. 1 schematically illustrates a side elevation view of a conventional truck 10 (i.e., a tractor without the semitrailer attached to the fifth wheel assembly 22. The truck 10 has a frame 12 that supports a cab 14. A front steer axle 16 is coupled to a front end of the frame 12, and front and rear drive axles 18 and 20 are coupled to a rear end of the frame by a suspension system 21. The front drive axle 18 is typically forward of the fifth wheel assembly 22, and the rear drive axle 20 is rearward of the fifth wheel assembly.

During operation, the truck 10 is subjected to road inputs that excite various modes of vibration at different resonant frequencies. Two low frequency modes of vibration, referred to as "rigid-body" modes, correspond to the bounce and pitch motions of the frame on the suspensions. For conventional cars and trucks, the suspension bounce frequency is largely governed by the body mass of the vehicle, the distance between the axles, and the suspension's spring stiffness. Typical suspension bounce and pitch frequencies are approximately 1–3 Hertz (Hz) or cycles per second.

A third vibration mode having a higher natural frequency is referred to as "axle-hop," which is characterized by the out-of-phase motion of the axles 16, 18, and 20, with respect to the frame 12. As a result, the wheels and axles 16, 18, and 20 bounce up and down while the frame 12 has very little vertical movement. The axle-hop frequency is typically in the 10–12 Hz range for most modern cars and trucks, and is mostly a function of tire stiffness, suspension stiffness, and axle mass.

A fourth vibration mode is referred to as "frame beaming," which is characterized by structural vibration of the frame 12 in a vertical plane at the frame's natural frequency, known as the frame beaming frequency. The frame beaming frequency is typically in the range of 6–12 Hz, inclusive. If sufficient energy is transmitted through the suspension system 21 to the frame 12 at the frame beaming frequency, that energy will excite the frame, resulting in vertical movement of the frame, thereby causing the truck's cab 14 to move up and down with the frame.

Unfortunately, the frame beaming frequency typically falls in the range where humans are most sensitive to vibration in the vertical direction. The frame beaming frequency also may coincide with the rotational frequency of truck tires at normal highway cruising speeds and, thus, frame beaming can be excited by tire and wheel non-uniformities such as imbalance, run-out, etc. Further, evenly spaced expansion joints on concrete highways or other non-uniformities in the road may also provide periodic excitation to the frame, very often near the frame beaming frequency.

As shown in FIG. 1 in phantom lines on the frame 12 and in an exaggerated amplitude, the vibration at the frame beaming frequency has nodal points where the frame experiences substantially no vertical motion during frame beaming. The forward most nodal point 30 generally occurs at a position near a rear engine mount on the frame. The rear nodal point 32 generally occurs at a position between the front and rear drive axles 18 and 20 and is generally aligned with the fifth wheel assembly 22.

Conventional air suspension systems are typically combined with shock absorbers or other dampeners that provide a portion of critical damping selected to provide the desirable balance of ride and handling qualities. Air suspension systems may also employ pneumatic damping in lieu of or in combination with shock absorbers.

One significant improvement in pneumatically damped vehicle suspension systems is described in U.S. Pat. No. 5,374,077, which is incorporated herein in its entirety by reference. The pneumatically damped vehicle suspension system provides damping which is load-dependent, so the amount of damping varies in approximate proportion to the load supported by the suspension system. Accordingly, a nearly constant fraction of critical damping is maintained over the normal range of operating loads.

The pneumatically damped suspension system utilizes two pneumatic damping circuits, including a high frequency damping circuit tuned to maximize damping at the axle hop frequency, and a low frequency damping circuit tuned to maximize damping at the suspension bounce frequency. Each high frequency damping circuit includes an air spring on one drive axle connected to an air spring on the other drive axle by a large diameter tube so air can substantially freely move between the air springs in response to a pressure differential between the air springs. At the higher axle hop frequency, the amplitude of the motion of the axles is large compared to that of the frame, and there is no intrinsic phase relationship between the two axles. If the two drive axles do not move in phase, air is transferred between air springs through the tube. The tube is sized to provide maximum damping via pumping losses at the axle hop frequency.

Each low frequency damping circuit includes an air spring pneumatically lumbed to a secondary air chamber by a small diameter tube. The air chambers and small diameter tubes are sized to provide maximum damping at the suspension bounce frequency. At the suspension bounce frequency, the frame and axles move in phase and the air springs deflect approximately the same amplitude, so very little air is transferred through the large diameter tubes between air springs. Thus, damping of suspension bounce is unaffected by the large diameter tubes between the air springs. Accordingly, the pneumatically damped suspension system is sufficiently tuned to provide damping at the axle hop and suspension bounce frequencies, thereby eliminating the need for hydraulic shock absorbers. While the pneumatically damped suspension system described in the U.S. Pat. No. 5,374,077 patent is very effective at providing damping at the axle hop and suspension bounce frequencies, the suspension system has no particular effect on frame beaming.

SUMMARY OF THE INVENTION

The present invention is directed to a pneumatic suspension system that overcomes drawbacks experienced in the prior art and solves other problems. In one embodiment, the pneumatic suspension system is for a vehicle having a frame with a frame beaming frequency, and the suspension system includes a first pneumatic spring connected to the vehicle's frame and to a first axle of the vehicle. A second pneumatic spring is connected to the frame and to a second axle. The first and second pneumatic springs contain a pneumatic fluid, such as air. A conduit includes the pneumatic fluid therein and is in fluid communication with the first and second pneumatic springs to allow the pneumatic fluid to move between the pneumatic springs. The conduit is sized to contain a select volume of the pneumatic fluid, and the pneumatic fluid in the conduit has a fluid resonant frequency.

The pneumatic springs and the conduit provide a system having a variable stiffness that ranges between a minimum stiffness and a maximum stiffness. The stiffness of the system is dependent upon the frequency of an input vibration applied to the pneumatic spring. The pneumatic springs, thus, have a variable effective spring stiffness that is dependent upon the frequency of the vibration or excitation applied to the spring. The system has approximately the minimum stiffness when the input vibration has a frequency that is a selected fraction of the fluid resonant frequency. The conduit is sized so the fraction of the fluid resonant frequency substantially corresponds to the frame beaming frequency. Accordingly, the system has approximately the minimum spring stiffness at the frame beaming frequency, so the pneumatic spring has a minimum effective stiffness at the frame beaming frequency. Accordingly, the pneumatic spring does not transmit dynamic force to the frame, thereby reducing frame beaming.

In another embodiment, the pneumatic conduit is sized to contain a selected volume of the pneumatic fluid, so the fluid has a resonant frequency in the range of 8.5–17.14 Hz, inclusive, and the selected fraction of the fluid resonant frequency is approximately 70% of the fluid resonant frequency.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with the suspension systems have not been shown in detail to avoid unnecessarily obscuring the description of the embodiments of the invention.

Figure 2:
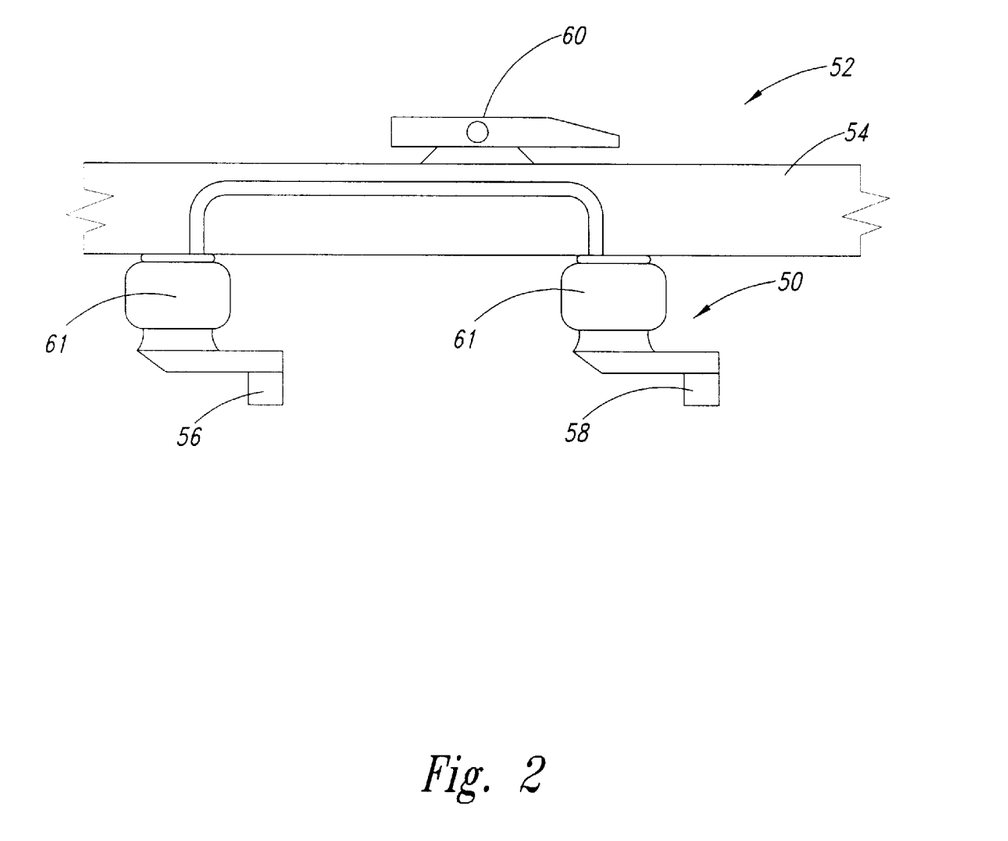
FIG. 2 is a partial schematic left side elevation view of a pneumatic suspension system in accordance with an embodiment out of the present invention, wherein air springs are coupled to a vehicle's frame and to forward and rear drive axles of the vehicle.

In accordance with an embodiment of the present invention, FIG. 2 illustrates a pneumatic suspension system 50 of a tandem axle vehicle 52. The suspension system 50 connects the vehicle's frame 54 to a forward drive axle 56 and to a rear drive axle 58. The forward and rear drive axles 56 and 58 are connected to conventional control linkages (not shown) that position the axles under the vehicle, react brake torque, and maintain wheel alignment. The forward and rear drive axles 56 and 58 are spaced apart from each other, and a fifth wheel 60 mounted to the top of the frame 54 is positioned above the space between the drive axles.

The suspension system 50 includes four air springs 61, two of which connect the forward drive axle 56 to the vehicle's frame 54. The other two air springs 61 connect the rear drive axle 58 to the frame 54. The air springs 61 absorb the vibration energy from the forward and rear drive axles 56 and 58 so as to minimize the dynamic forces transmitted to the frame 54. The extent to which the air springs 61 transmit dynamic forces depends upon the spring stiffness. An air spring with a smaller spring stiffness transmits less dynamic force for a given axle displacement than a stiffer spring. As is known, the spring action of absorbing or storing vibration energy is significantly different than damping, which dissipates energy, gradually diminishing the amplitude of the vibration.

Figure 3:
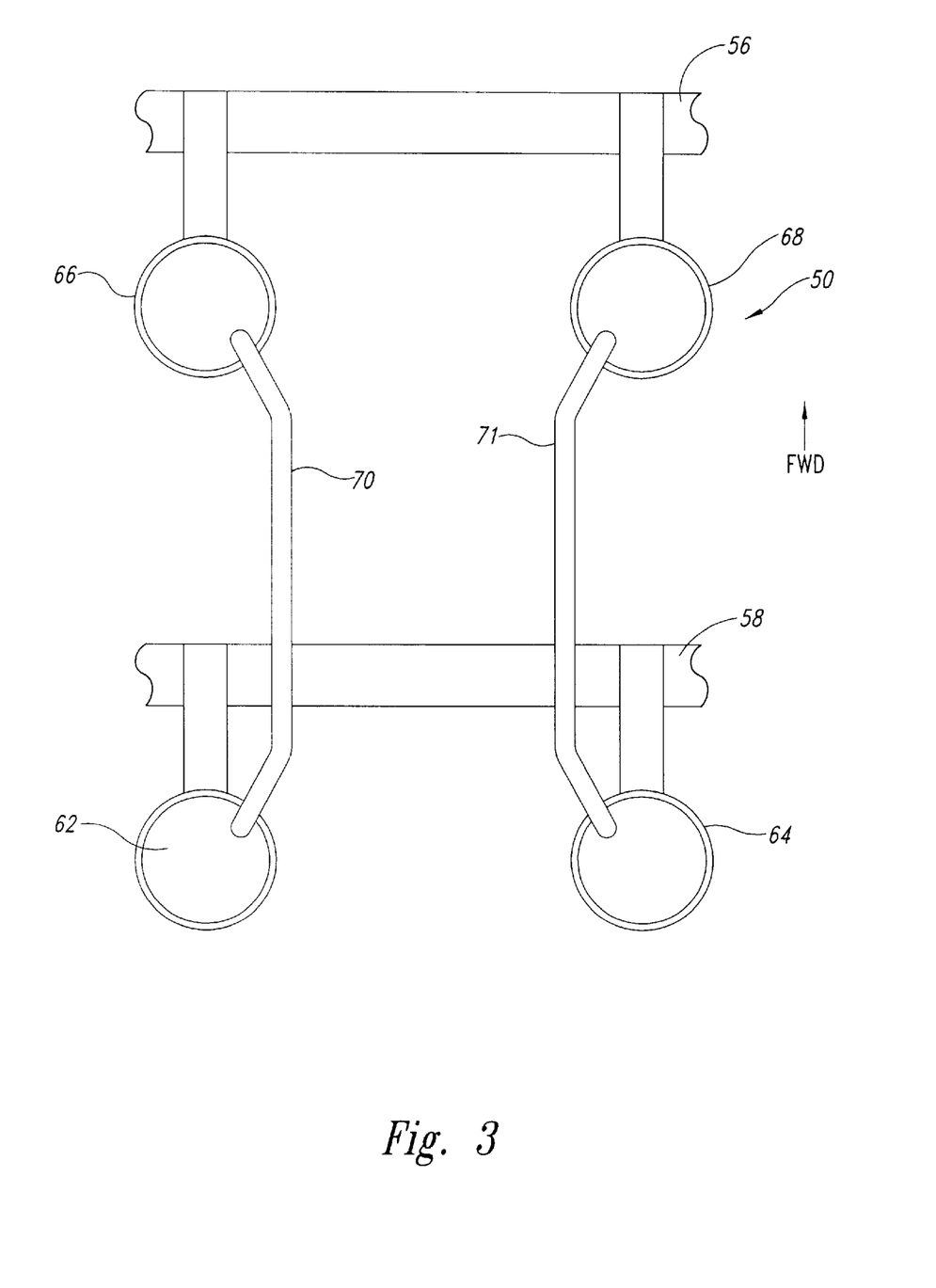
FIG. 3 is a plan view of the pneumatic suspension system of FIG. 2.

As best seen in FIG. 3, the suspension system 50 has a left rear air spring 62 connected to the left side of the rear drive axle 58, and a right rear air spring 64 connected to the right side of the rear drive axle. A left front air spring 66 is connected to the left side of the forward drive axle 56, and a right front air spring 68 is connected to the right side of the forward drive axle. The left rear air spring 62 is connected to the left front air spring 66 by a left conduit 70, so the left air springs are in fluid communication with each other. The left rear air spring 62, the left front air spring 66, and the left conduit 70 define a pneumatic circuit containing air, wherein the air can move between the left air springs through the left conduit.

On the right side of the suspension system, the right rear air spring 64 is connected to the right front air spring 68 by a right conduit 71, so the right air springs are in fluid communication with each other. The right rear air spring 64, the right front air spring 68, and the right conduit 71 define a pneumatic circuit containing air, wherein the air can move between the right air springs through the right conduit. This illustrative embodiment uses air in the pneumatic suspension system 50, although another selected pneumatic fluid can be used, and the suspension system is tuned in accordance with the characteristics of the selected pneumatic fluid.

In an alternate embodiment, the front and rear air springs are cross connected, so the left front air spring 66 is connected to the right rear air spring 64 by a conduit (not shown). The right front air spring 68 is connected to the left rear air spring 62 by a conduit (not shown). Accordingly, air can move between front and rear air springs as needed in response to input vibrations applied to the forward or rear drive axle, 58 or 56, respectively.

Each of the air springs 62, 64, 66, and 68 has a spring stiffness, and when each air spring is isolated, i.e., not in fluid communication with another air spring, the spring stiffness is not dependent upon the frequency of the input vibration. The stiffness of each air spring is given by the expression:

$$k = nA_s^2 P_a / V_s, \text{ wherein}$$

n=polytropic gas constant (1.4 for air)
$A_s$=effective area of spring
$P_a$=absolute pressure of the air in the air spring
$V_s$=volume of the air spring When an air spring on one drive axle, however, is in fluid communication with an air spring on the other drive axle, the air springs and conduit provide a system having a variable stiffness, dependent upon the frequency of the input vibration applied to one or both of the air springs. Accordingly, each air spring has a variable effective spring stiffness that is frequency dependent. The suspension system 50 has a minimum stiffness at one input vibration frequency and higher stiffnesses at other input vibration frequencies. The suspension system 50, as discussed in greater detail below, is tuned so it has a lower spring rate when the input vibration is in a selected range of frequencies substantially corresponding to the frame beaming frequency, which is typically in the range of 6–12 Hz. Thus, the input vibrations at the frame beaming frequency are absorbed and not passed on to the frame 54, thereby minimizing frame beaming during operation of the vehicle 52.

If both the forward and rear drive axles 58 and 56 are simultaneously vertically displaced the same distance, the pressure differential in the air springs 62, 66 and 64, 68 connected together by a conduit 70, 71 will remain the same. So, substantially no air will flow through the respective conduit between the front and rear air springs. If, however, one of the drive axles 56, 58 is displaced vertically a greater distance or at a different time than the other drive axle, the resulting pressure differential between the interconnected air springs 62, 66 and 64, 68 causes the air to flow between the air springs through the respective air conduit 70, 71.

The conduits 70, 71 have a small cross-sectional area relative to the cross-sectional area of the air springs 62, 64, 66, 68. The mass of the air contained within each conduit 70, 71 is relatively small, and the air's velocity and displacement in the conduit is large compared to the air's velocity and displacement within the air spring to which the conduit is connected. As a result, the acceleration of the air within the conduit 70, 71 is large, and the resulting inertial effects of the air influence the dynamics of the air flow between the air springs 62, 66 and 64, 68 through the respective conduit 70, 71.

For a given flow area and length, the mass of the column of air contained in each conduit is given by the expression:

$$m = \rho \cdot A \cdot L$$

$\rho$=mass density of air in the conduit
A=cross-sectional area of the conduit
L=length of the conduit.

The apparent stiffness acting on each end of the column of air in each conduit 70, 71 is given by the expression:

$$k' = (n \cdot P_a A_s^2)/V_s, \text{ wherein}$$

n=polytropic gas constant (1.4 for air)
$P_a$=air pressure in air spring (in absolute)
$A_s$=cross-sectional area of the conduit
$V_s$=volume in air spring.

Figure 4:
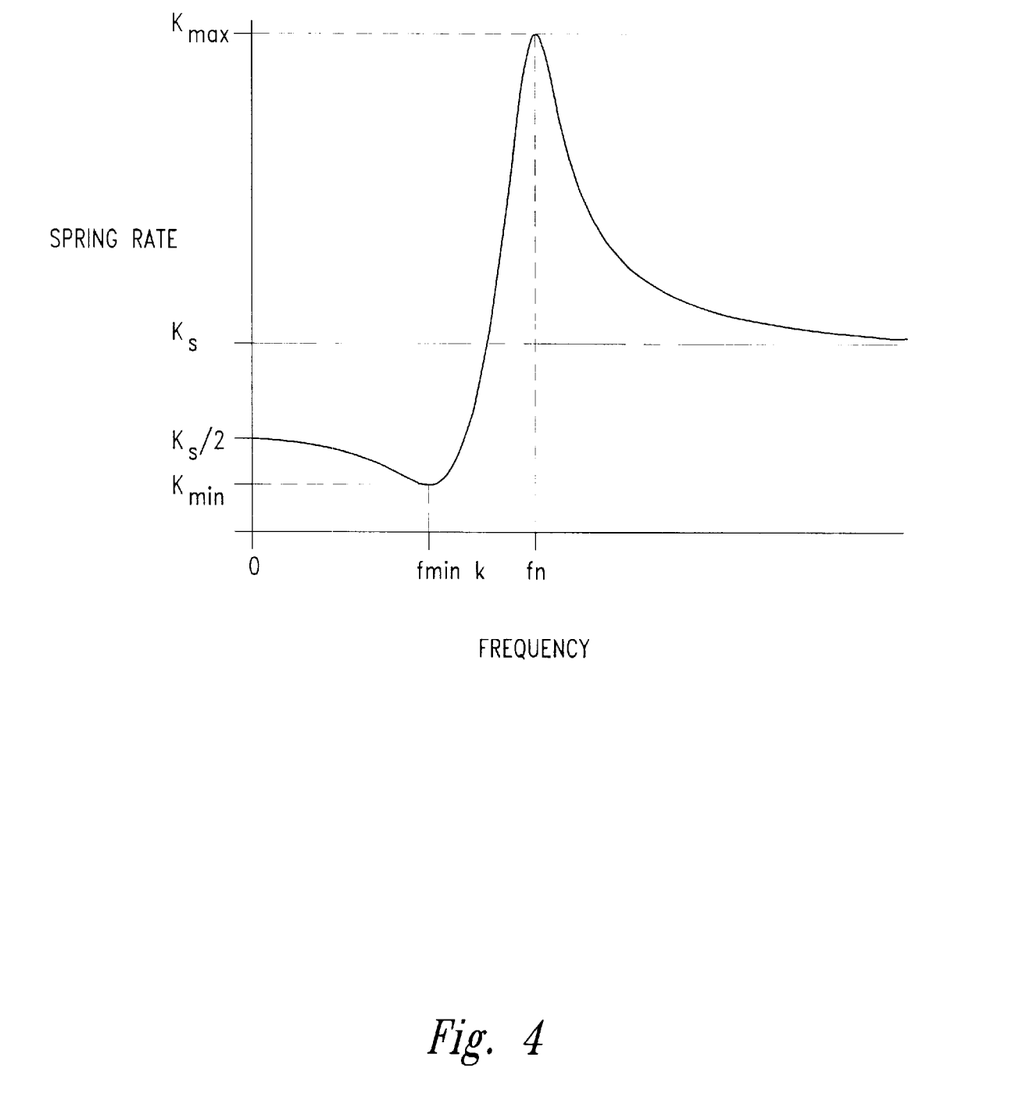
FIG. 4 is a spring rate response graph for an air spring in the suspension system of FIG. 3 as a function of input vibration frequency.

For small deflections applied to the air springs, such as may be generated by tire or wheel non-uniformities, the pressure differentials across the conduit are relatively small compared to the total pressure of the air springs, so the stiffnesses acting on each end of the air column differs only slightly. As a result, the mass of air in the conduits 70, 71 will have a resonant frequency that is substantially given by the expression:

$$f_n = 1/(2\pi) \cdot (2k'/m)^{1/2}, \text{ wherein}$$

m=mass of the air in the conduit
k'=apparent stiffness acting on each end of the column of air in conduit Because of changing phase relationships between the motion of the air springs 62, 66 and 64, 68, and the flow of air in the respective air conduit 70, 71 in the vicinity of the air mass' resonant frequency, the effective stiffness of each air spring changes with the input vibration frequency applied to the air spring. FIG. 4 illustrates graphically the change in spring stiffness for an input vibration applied to one of the air springs 62, 64, 66, 68. As the input vibration's frequency increases, the effective spring stiffness of the air spring gradually diminishes until it reaches a minimum spring stiffness shown as $K_{min}$ on the vertical scale. The minimum spring stiffness, $K_{min}$ occurs when the input vibration's frequency is a fraction of the resonant frequency $f_n$ of the column of air in the conduit 70, 71. In the illustrated embodiment, the minimum spring stiffness $K_{min}$ occurs at approximately 70% of the resonant frequency $f_n$ of the column of air.

As the input vibration's frequency increases to the resonant frequency $f_n$ of the column of air in the conduit, the effective stiffness of the air spring also increases. In the illustrated embodiment, the air spring has a maximum stiffness $K_{max}$ at approximately the air column's resonant frequency $f_n$. As the input vibration's frequency increases from the air column's resonant frequency $f_n$, the air spring's effective stiffness decreases to a stiffness substantially equivalent to the stiffness $k_s$ of an isolated air spring that is not connected to another air spring by an air conduit.

Figure 5:
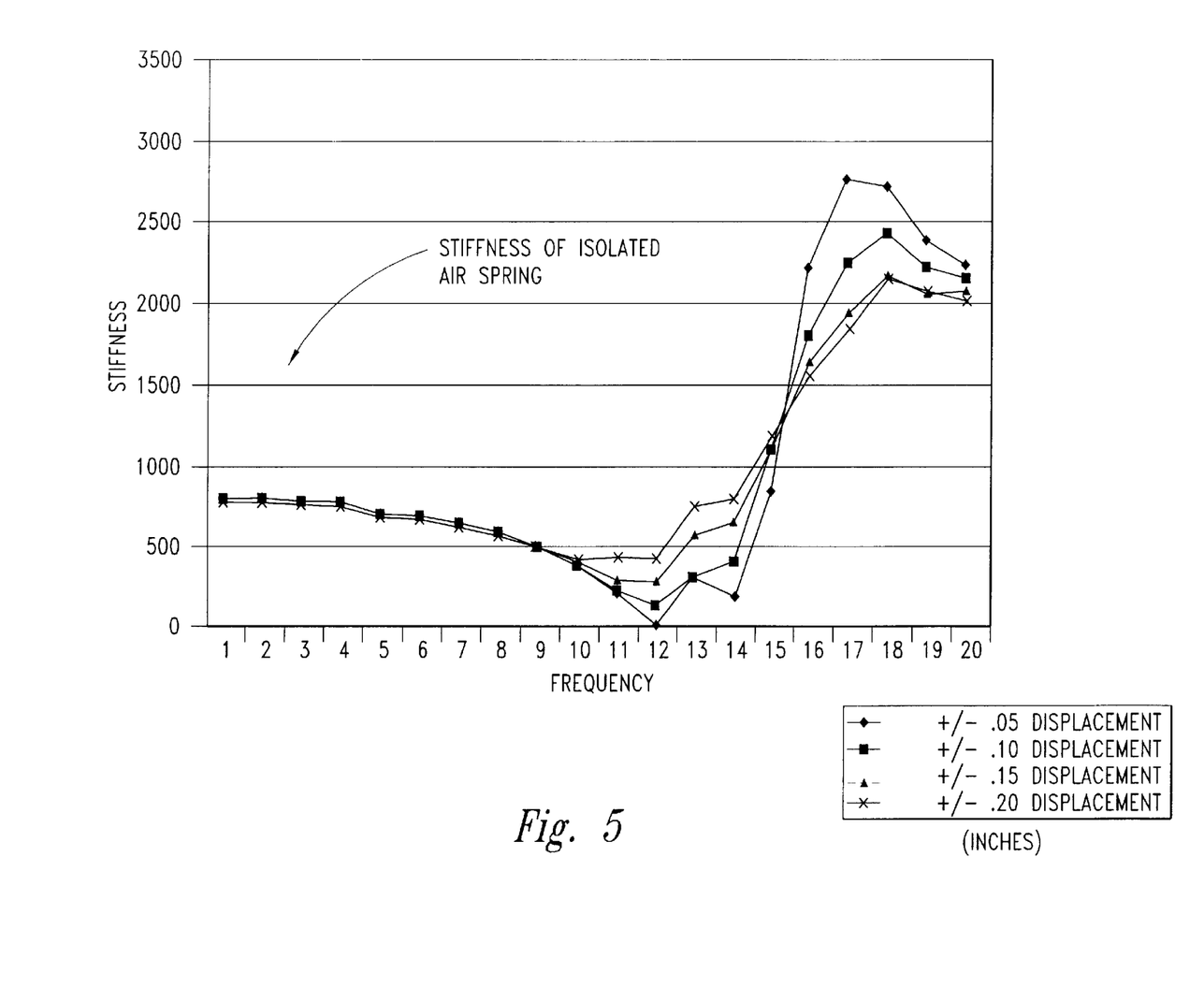
FIG. 5 is a spring stiffness response graph for an embodiment of the suspension system of FIG. 3 showing the spring stiffness as a function of input vibration frequency and spring displacement.

The minimum and maximum stiffnesses of each air spring 62, 64, 66, 68 are also a function of the displacement amplitude of the input vibration applied to the respective air spring. FIG. 5 illustrates graphically an air spring's stiffness response curve for displacement amplitudes of ±0.5, ±0.10, ±0.15, and ±0.20 inches. The air spring's stiffness varies more dramatically for input vibration having smaller amplitude (e.g. ±0.05 inches) as compared to an input vibration having a larger amplitude (e.g., ±0.20 inches).

The suspension system 50 of the embodiment illustrated in FIG. 3 has the conduits 70 and 71 sized to contain a volume of air with a selected mass and a resonant frequency such that the air springs 62, 64, 66, and 68, have a lower or minimum spring stiffness when the input vibration frequency applied to the air springs is within the frame beaming frequency range, namely, in the range of approximately 6–12 Hz, inclusive. In one embodiment, the air conduits 70 and 71 and the air springs 62, 64, 66, 68, are sized so the minimum spring stiffness of the air springs occurs when the input vibration's frequency is in the range of approximately 6–12 Hz, inclusive. Accordingly, when the front and rear drive axles 58 and 56 are subjected to various vibrations, such as from tire and wheel non-uniformities or roadway inconsistencies, the air springs 62, 64, 66, and 68, are softest at the input vibration's frequency corresponding to the beaming frequency, thereby minimizing frame beaming.

In the illustrated embodiment, the resonant frequency of the columns of air in the conduits 70 and 71 are given by the expression:

$$f_n = 251(A/(V_s L))^{1/2}$$

wherein the area A, the volume $V_s$, and the length L of the conduit are in the units of feet. The minimum spring stiffness occurs at approximately 70% of the air mass' resonant frequency, and the frame beaming frequency is in the range of 6–12 Hz, inclusive. So, the air conduits 70 and 71 are sized to contain a column of air with a resonant frequency in the range of approximately 8.6–17.15 Hz, inclusive. In one embodiment, the frame beaming frequency is in the range of 7–8 Hz, inclusive, and the column of air in each conduit has a resonant frequency in the range of 10–11.43 Hz., inclusive. Therefore, each conduit 70 and 71 is sized so the air springs 62, 64, 66, and 68, are approximately the softest for the input vibrations with frequencies corresponding to the frame beaming frequency. The suspension system 50 is, thus, tuned to reduce frame beaming, thereby providing an enhanced ride of the vehicle.

As an example, the suspension system 50 of one embodiment has air springs with an internal volume ($V_s$) of 0.218 ft.$^3$ The air conduits 70 and 71 have a cross-sectional area A of 0.00545 ft.$^2$ (e.g., an inside diameter of 1 inch), and a length L of 6 ft. Thus, the resonant frequency of the air contained in the air conduit 70, 71 is approximately 16.2 Hz. Therefore, the suspension system 50 is tuned for a vehicle having a frame with a frame beaming frequency of approximately 11.34 Hz.

Figure 6:
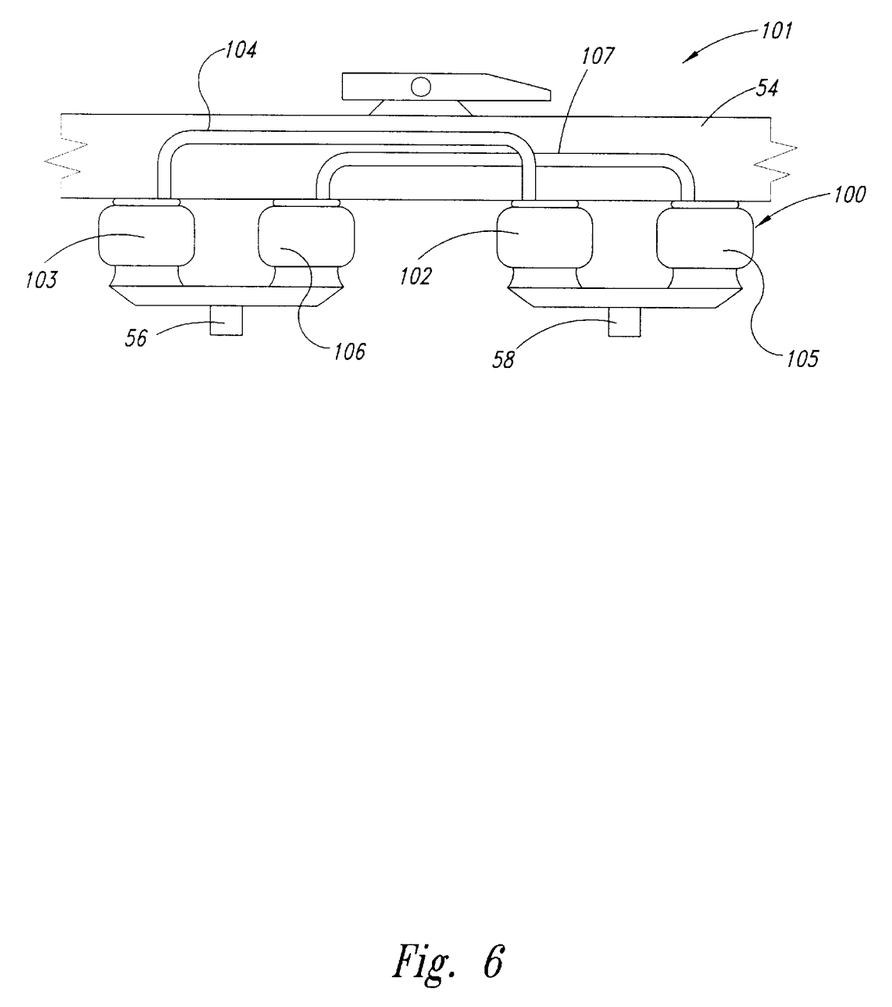
FIG. 6 is a partial schematic side elevation view of a pneumatic suspension system in accordance with an alternate embodiment.
Figure 7:
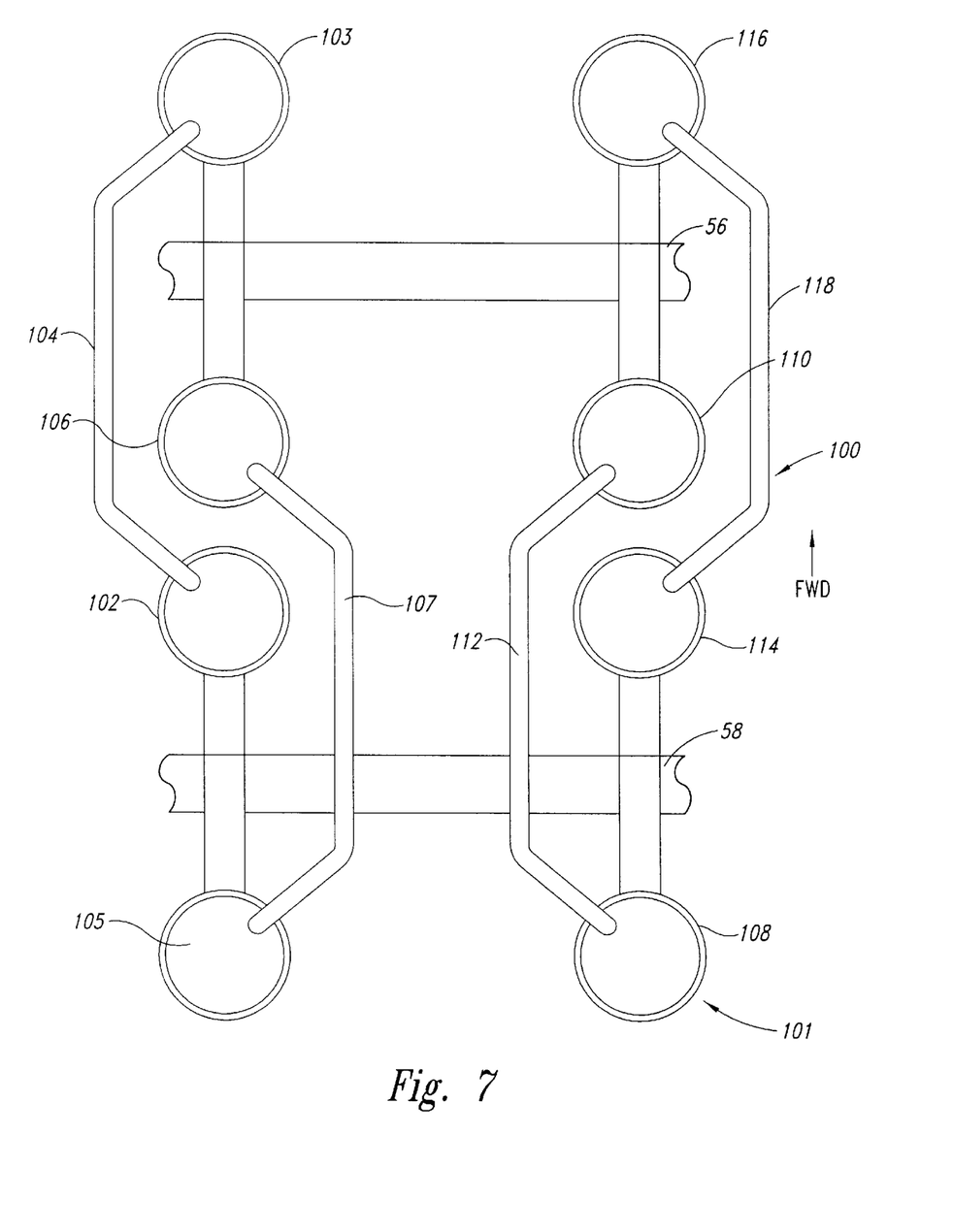
FIG. 7 is a schematic top plan view of the pneumatic suspension system of FIG. 6 showing eight air springs attached to the front and rear drive axles of a vehicle.

As shown in FIGS. 6 and 7, a suspension system 100 of an alternate embodiment has eight air springs 101, including front and back air springs connected to the left and right ends of the forward and rear drive axles 56 and 58. A front air spring 102 on the left side of the rear drive axle 58 is connected to a front air spring 103 on the left side of the forward drive axle 56 by a left front air conduit 104. A back air spring 105 on the left side of the rear axle 58 is connected to a back air spring 106 on the left side of the forward drive axle 56 by a left rear conduit 107. As best seen in FIG. 7, a back air spring 110 on the right side of the forward drive axle 56 is connected to a back air spring 108 on the right side of the rear drive axle 58 by a right rear conduit 112. A front air spring 114 on the right side of the rear axle 58 is connected to a front air spring 116 on the right side of the forward axle 56 by a right front conduit 118. Accordingly, each air spring on one drive axle is in fluid communication with a respective air spring on the other drive axle.

Each air spring 102, 103, 105, 106, 108, 110, 114, and 116, has a variable spring stiffness dependent upon the frequency of the input vibration applied to the respective air spring. Each conduit 104, 107, 112, and 118 is sized to contain a column of air having a resonant frequency so the air springs attached to the conduit have a minimum spring stiffness approximately at the frame beaming frequency.

In an alternate embodiment, the suspension system 100 has cross-communicating air springs, wherein each air spring on the left side of the rear drive axle is connected to an air spring on the right side of the forward drive axle by a conduit.

Similarly, each air spring on the right side of the rear drive axle is connected to an air spring on the left side of the forward drive axle.

In the embodiments described above and illustrated in FIGS. 2, 3, 6 and 7, the suspension systems do not have additional air chambers or reservoirs plumbed to the air springs, because additional air volume for damping is not needed for the systems.

As a result, the suspension systems have fewer components, require less space on the truck, and reduce the weight and cost of the suspension systems. In alternate embodiments for selected trucks or other vehicles, the suspension systems have air chambers plumbed to the air springs with small diameter tubes so as to allow the suspension system to be tuned for damping particular vibrations experienced during operation of the vehicle.

Although specific embodiments of the invention are described herein for illustrative purposes, various modifications may be made without deviating from the spirit and scope of the invention, as will be recognized by those skilled in the relevant art. The teachings provided herein can be applied to suspension systems for vehicles, not necessarily limited to the trucks described above. Various air springs and air conduits can be used with the size and configuration being suitable so as to provide the fluid interconnection between air springs on adjacent axles such that the air springs substantially have a minimum spring stiffness when the vibration input frequency approximately corresponds to the vehicle's frame beaming frequency.

These, and other changes can be made to the invention in light of the above detailed description. In general, in the following claims, the terms used should not be construed to limit the invention to the specific embodiments disclosed in the specification and the claims, but should be construed to include all air springs and air conduits that operate in accordance with the claims. Accordingly, the invention is not limited by the disclosure, but instead its scope is to be determined entirely by the following claims.

I claim:

1. A pneumatic suspension system for a vehicle, first and second axles and a frame, the vehicle frame having a frame beaming frequency, comprising:

a first pneumatic spring connected to the first axle and the frame and being subjected to input vibrations from the first axle, the first pneumatic spring containing pneumatic fluid;

a second pneumatic spring connected to the second axle and the frame, the second pneumatic spring containing the pneumatic fluid; and a pneumatic conduit in fluid communication with the first and second pneumatic springs, the pneumatic conduit containing the pneumatic fluid therein and being configured to allow the pneumatic fluid to move between the first and second pneumatic springs, the pneumatic fluid in the pneumatic conduit having a resonant frequency in the range of approximately 8.5 to 17.5 Hertz, inclusive, and the first and second pneumatic springs and the conduit define a system having a variable stiffness with a minimum spring stiffness when the input vibration has a frequency substantially corresponding to the frame beaming frequency, and wherein the first pneumatic spring has an internal volume, and the pneumatic conduit has a length and a cross-sectional area, the pneumatic conduit being shaped and sized so the resonant frequency of the pneumatic fluid therein is approximately equal to $$251 \cdot (A/(V \cdot L))^{1/2}, \text{ wherein:}$$

A=cross sectional area of the pneumatic conduit;
V=internal volume of the first pneumatic springs; and
L=length of the pneumatic conduit, where the units of measure are in feet.

2. The pneumatic suspension system of claim 1 wherein the first pneumatic spring is an air spring, and the pneumatic fluid is air.

3. The pneumatic suspension system of claim 1 wherein the minimum spring stiffness occurs at approximately 70% of the resonant frequency of the pneumatic fluid.

4. The pneumatic suspension system of claim 1 wherein the first pneumatic spring has a maximum spring stiffness at approximately 100% of the resonant frequency of the pneumatic fluid.

5. The pneumatic suspension system of claim 1, further including:
   a third pneumatic spring connected to the first axle and the frame, the third pneumatic spring containing a second pneumatic fluid;
   a fourth pneumatic spring connected to the second axle and the frame, the fourth pneumatic spring containing the second pneumatic fluid; and
   a second pneumatic conduit in fluid communication with the third and fourth pneumatic springs, the second pneumatic conduit containing the second pneumatic fluid therein and being configured to allow the second pneumatic fluid to move between the third and fourth pneumatic springs, the second pneumatic fluid in the second pneumatic conduit having a second resonant frequency in the range of approximately 8.5 to 17.15 Hertz, inclusive.

6. The pneumatic suspension system of claim 1 wherein the first pneumatic spring has the minimum spring stiffness when the beaming frequency is in the range of approximately 6 to 12 Hertz, inclusive.

7. The pneumatic suspension system of claim 1 wherein the first pneumatic spring has the minimum spring stiffness when the beaming frequency is in the range of approximately 7 to 8 Hertz, inclusive.

8. The pneumatic suspension system of claim 1 wherein the pneumatic fluid is fully contained in only the first and second pneumatic springs and the pneumatic conduit.

9. A pneumatic suspension system for a vehicle, the vehicle having a frame with a frame beaming frequency, comprising:
   a first pneumatic spring connected to the frame, the first pneumatic spring having a pneumatic fluid therein, the first pneumatic spring being positionable to receive an input vibration with a frequency,
   a second pneumatic spring connected to the frame, the second pneumatic spring having the pneumatic fluid therein; and
   a pneumatic conduit in fluid communication with the first and second pneumatic springs, the pneumatic conduit having the pneumatic fluid therein and being configured to allow the pneumatic fluid to move between the first and second pneumatic springs, the pneumatic fluid in the pneumatic conduit having a fluid resonant frequency, the first and second pneumatic springs and the conduit define a system having a variable stiffness wherein the stiffness is dependent upon the frequency of the input vibration, the input vibration frequency being a fraction of the fluid resonant frequency, the pneumatic conduit being sized so the fraction of the fluid resonant frequency substantially corresponds to the beaming frequency, and the system has a minimum stiffness when the frequency of the input vibration substantially corresponds to the fraction of the fluid resonant frequency, and wherein the first pneumatic spring has an internal volume and the pneumatic conduit has a length and a cross-sectional area. the pneumatic conduit being shaped and sized so the fluid resonant frequency of the pneumatic fluid is approximately equal to $$251 \cdot (A/(V \cdot L))^{1/2}, \text{ wherein:}$$

A=cross sectional area of the pneumatic conduit;
V=volume of the first pneumatic spring; and
L=length of the pneumatic conduit,
where units of measure are in feet.

10. The pneumatic suspension system of claim 9 wherein the first pneumatic spring is an air spring, and the pneumatic fluid is air.

11. The pneumatic suspension system of claim 9 wherein the predetermined fraction of the fluid resonant frequency is approximately 70% of the fluid resonant frequency.

12. The pneumatic suspension system of claim 9 wherein the first pneumatic spring has a maximum spring stiffness when the input vibration's frequency is approximately 100% of the fluid resonant frequency.

13. The pneumatic suspension system of claim 9 wherein the second pneumatic spring has a variable effective spring stiffness and is subjected to the input vibration, and the first pneumatic spring has a minimum effective spring stiffness wherein the input vibration has a frequency that substantially corresponds to the frame beaming frequency.

14. The pneumatic suspension system of claim 9 wherein the system has the minimum spring stiffness when the beaming frequency is in the. range of approximately 6 to 12 Hertz, inclusive.

15. The pneumatic suspension system of claim 9, further including:
   a third pneumatic spring connected to the frame, the third pneumatic spring having a second pneumatic fluid therein, the third pneumatic spring being positionable to receive a second input vibration with a frequency;
   a fourth pneumatic spring connected to the frame, the fourth pneumatic spring having the second pneumatic fluid therein; and
   a second pneumatic conduit in fluid communication with the third and fourth pneumatic springs, the second pneumatic conduit having the second pneumatic fluid therein and allowing the second pneumatic fluid to move between the third and fourth pneumatic springs, the second pneumatic fluid in the second conduit having a second fluid resonant frequency, and the third and fourth pneumatic springs and the second conduit define a second system having a second variable stiffness wherein the stiffness is dependent upon the frequency of the second, input vibration, the second input vibration frequency being a second fraction of the second fluid resonant frequency, the second pneumatic conduit being sized so the second fraction of the second fluid resonant frequency substantially corresponds to the beaming frequency, and the second system has the minimum stiffness when the second input vibration substantially corresponds to the second fraction of the second fluid resonant frequency.

16. The pneumatic suspension system of claim 9 wherein the pneumatic fluid in the pneumatic conduit has a resonant frequency in the range of approximately 8.5 to 17.15 Hertz, inclusive.

17. The pneumatic suspension system of claim 9 wherein the pneumatic fluid in the pneumatic conduit having a resonant frequency in the range of approximately 10 to 11.43 Hertz, inclusive.

18. A pneumatic suspension system for a vehicle, the vehicle having a frame with a frame beaming frequency and first and second axles, comprising:

a first pneumatic spring having a pneumatic fluid therein and being connected to the first axle and the frame;

a second pneumatic spring having the pneumatic fluid therein and being connected to the second axle and the frame;

a pneumatic conduit in fluid communication with the first and second pneumatic springs to define a system, the pneumatic conduit having the pneumatic fluid therein and adapted to allow the pneumatic fluid to move between the first and second pneumatic springs, the pneumatic fluid in the pneumatic conduit having a fluid resonant frequency, wherein the system has a variable stiffness with the stiffness being dependent upon a frequency of an input vibration applied to first axle, first and second pneumatic springs and the pneumatic conduit being sized so the system has a minimum stiffness when the frequency of the input vibration substantially corresponds to the beaming frequency, and wherein the first pneumatic spring has an internal volume. and the pneumatic conduit has a length and a cross-sectional area, the pneumatic conduit being shaped and sized so the fluid resonant frequency of the pneumatic fluid is approximately equal to $251 \cdot (A/(V \cdot L))^{1/2}$, wherein:

A=cross sectional area of the pneumatic conduit;

V=volume of the first pneumatic spring; and

L=length of the pneumatic conduit.

where units of measure are in feet.

19. The pneumatic suspension system of claim 18 wherein the first pneumatic spring is an air spring, and the pneumatic fluid is air.

20. The pneumatic suspension system of claim 18 wherein the first pneumatic spring has a minimum effective spring stiffness in the range of at approximately 6 to 12 Hertz, inclusive.

21. The pneumatic suspension system of claim 18 wherein the first pneumatic spring has a minimum effective spring stiffness in the range of at approximately 7 to 8 Hertz, inclusive.

* * * * *

UNITED STATES PATENT AND TRADEMARK OFFICE
CERTIFICATE OF CORRECTION

PATENT NO : 6,149,142
DATED : November 21, 2000
INVENTOR(S) : Roger P. Penzotti

It is certified that errors appear in the above-identified patent and that said Letters Patent are hereby corrected as shown below:

Claim 9, column 10, line 13 "volume and the pneumatic" should read --volume, and the pneumatic--.

Claim 9, column 10, line 14 "cross-sectional area. the" should read --cross-sectional area, the--.

Claim 15, column 10, line 65 " the second, input" should read --the second input--.

Signed and Sealed this

Fifteenth Day of May, 2001

*Attest:*

NICHOLAS P. GODICI

*Attesting Officer*     *Acting Director of the United States Patent and Trademark Office*